US012791779B2

(12) United States Patent
You et al.

(10) Patent No.: US 12,791,779 B2
(45) Date of Patent: Nov. 10, 2026

(54) BACKLIGHT MODULE

(71) Applicant: DARWIN PRECISIONS CORPORATION, Hsinchu County (TW)

(72) Inventors: Jian-Jhih You, Hsinchu County (TW); Yu-Huan Chiu, Hsinchu County (TW); Wen-Tai Shen, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 0 days.

(21) Appl. No.: 19/415,718

(22) Filed: Dec. 10, 2025

(65) Prior Publication Data

US 2026/0186192 A1 Jul. 2, 2026

(30) Foreign Application Priority Data

Dec. 27, 2024 (TW) ................................ 113151365

(51) Int. Cl.
*F21V 8/00* (2006.01)

(52) U.S. Cl.
CPC ......... *G02B 6/0035* (2013.01); *G02B 6/0036* (2013.01); *G02B 6/0055* (2013.01); *G02B 6/0065* (2013.01)

(58) Field of Classification Search
CPC .. G02B 6/0035; G02B 6/0036; G02B 6/0055; G02B 6/0065
See application file for complete search history.

(56) References Cited

U.S. PATENT DOCUMENTS

| | | | | |
|---|---|---|---|---|
| 7,967,493 B2 * | 6/2011 | Liao | G02B 6/0036 | 362/625 |
| 10,605,974 B2 | 3/2020 | Wang et al. | | |
| 10,859,751 B1 | 12/2020 | Chiu et al. | | |
| 11,835,750 B1 | 12/2023 | Chiu et al. | | |
| 12,124,132 B2 | 10/2024 | Liu | | |
| 2010/0091520 A1 * | 4/2010 | Liao | G02B 6/0036 | 362/616 |
| 2015/0226901 A1 * | 8/2015 | Lee | G02B 6/0036 | 362/606 |

(Continued)

FOREIGN PATENT DOCUMENTS

| | | |
|---|---|---|
| CN | 118011552 A | 5/2024 |
| EP | 4235284 A1 | 8/2023 |
| WO | 2024062212 A1 | 3/2024 |

*Primary Examiner* — Zheng Song

(57) ABSTRACT

A backlight module includes the following features. A privacy film is disposed on a light path of a light source assembly. A light guide plate has optical microstructures, a light incident surface and a surface connected to each other. The surface faces the privacy film. The optical microstructures each have a rounded corner, and a first convex surface and a second convex surface that stand on the surface. The rounded corner is connected to the first convex surface and the second convex surface. An angle between the first convex surface and the surface is 30°-70°, and the radius of curvature of the rounded corner is 0.001-0.005 mm. The first convex surface faces the light incident surface when the optical microstructures are sunken from the surface. The first convex surface faces away from the light incident surface when the optical microstructures are protruded from the surface.

13 Claims, 6 Drawing Sheets

(56) References Cited

U.S. PATENT DOCUMENTS

| | | | | |
|---|---|---|---|---|
| 2015/0268404 | A1* | 9/2015 | Chiu | G02B 6/0036 362/625 |
| 2016/0238777 | A1* | 8/2016 | Chen | G02B 6/0016 |
| 2019/0324328 | A1* | 10/2019 | Chen | G02B 5/0278 |
| 2022/0350071 | A1 | 11/2022 | Fattal et al. | |
| 2023/0384504 | A1 | 11/2023 | Chiu et al. | |
| 2024/0045131 | A1* | 2/2024 | Wang | G02B 6/0055 |
| 2024/0192434 | A1* | 6/2024 | Lee | G02B 6/0063 |

* cited by examiner

BACKLIGHT MODULE

FIELD OF THE INVENTION

The present invention relates to an optical module, and more particularly to a backlight module.

BACKGROUND OF THE INVENTION

The components of a liquid crystal display mainly include a backlight module, a display panel and a frame, etc. Many backlight modules provide anti-peeping functions as the liquid crystal displays are widely used in various occasions. For example, when the backlight module is in a sharing mode, more light beams are emitted at larger angles. In this way, the backlight module is able to provide a larger viewing angle. On the contrary, when the backlight module is in a privacy mode, more light beams are emitted at smaller angles to reduce the viewing angle.

However, a conventional backlight module still has a problem of insufficient brightness at large angles when it is in the sharing mode, thereby affecting the viewing angle of the sharing mode. The problem of insufficient brightness of the light being emitted at large angles can be slightly improved by increasing the brightness of the backlight module, but it will also cause the backlight module to be overheated easily. Additionally, the conventional backlight module can only provide symmetrical viewing angles in the horizontal viewing angles when it is in the sharing mode, which limits its application occasions.

SUMMARY OF THE INVENTION

The present invention provides a backlight module to enhance brightness of light emitted at large angles, and provides an asymmetric viewing angle at horizontal viewing angles.

To achieve one or part or all of the above purposes or other purposes, an embodiment of the present invention provides a backlight module including a light source assembly, a privacy film, a first light-emitting element and a first light guide plate. The light source assembly is adapted to emit a light beam. The privacy film is disposed on a transmitting path of the light beam. The first light guide plate is disposed on a side of the privacy film facing away from the light source assembly. The first light guide plate has a first light incident surface, a surface and a plurality of optical microstructures. The first light incident surface is opposite to the first light-emitting element, and the surface faces the privacy film and is connected to the first light incident surface. The optical microstructures are sunken or protruded from the surface, and each have a first convex surface, a second convex surface and a rounded corner. The first convex surface and the second convex surface stand on the surface, and the rounded corner is connected to the first convex surface and the second convex surface. A first included angle included between each of the first convex surfaces and the surface is between 30° and 70°, and a radius of curvature of the rounded corner is between 0.001 mm and 0.005 mm. When the optical microstructures are sunken from the surface, the first convex surfaces face the first light incident surface, and the second convex surfaces face away from the first light incident surface. When the optical microstructures are protruded from the surface, the first convex surfaces face away from the first light incident surface, and the second convex surfaces face the first light incident surface.

In an embodiment of the present invention, each of the first included angles is, for example, between 40° and 60°.

In an embodiment of the present invention, each of the optical microstructures has a first top point. A first contour is formed on the surface by each of the first convex surfaces. Each of the first contours is curved and has a first top point protruded opposite to each of the second convex surfaces. Each of the first convex surfaces may have a first imaginary tangent, and each of the optical microstructures may further have an imaginary cross section. Each of the imaginary cross sections passes through each of the first top points and is perpendicular to the first light incident surface and the surface. Each of the first imaginary tangents passes through each of the first top points and is located on each of the imaginary cross sections, and the first included angles can be respectively included between the first imaginary tangents and the surfaces.

In an embodiment of the present invention, a second included angle between each of the second convex surfaces and the surface is, for example, between 20° and 40°.

In an embodiment of the present invention, a second contour is formed on the surface by each of the second convex surfaces. Each of the second contours is curved and has a second top point protruded away from each of the first convex surfaces. Each of the second convex surfaces may have a second imaginary tangent, and each of the optical microstructures may further have an imaginary cross section. Each of the imaginary cross sections passes through each of the second top points and is perpendicular to the first light incident surface and the surface. Each of the second imaginary tangents passes through each of the second top points and is located on each of the imaginary cross sections, and the second included angles can be respectively included between the second imaginary tangents and the surface.

In an embodiment of the present invention, a maximum length of each of the optical microstructures in a normal direction of the first light incident surface may be between 0.005 mm and 0.050 mm.

In an embodiment of the present invention, a maximum width of each of the optical microstructures in a direction perpendicular to the normal direction of the first light incident surface is W. Each of the optical microstructures further has a top point, each of the top points is located on a side of each of the rounded corners facing away from the surface, and a maximum height of each of the optical microstructures between each of the top points and the surface is H. $0.2 \leq H/W \leq 0.5$.

In an embodiment of the present invention, each of the maximum widths may be between 0.002 mm and 0.050 mm.

In an embodiment of the present invention, each of the maximum heights is, for example, between 0.001 mm and 0.025 mm.

In an embodiment of the present invention, the light source assembly can include a second light guide plate and a second light-emitting element. The second light guide plate has a second light incident surface and a light-emitting surface connected to the second light incident surface, and the light-emitting surface faces the privacy film. The second light-emitting element is disposed opposite to the second light incident surface.

In an embodiment of the present invention, the light source assembly further includes, for example, a third light guide plate. The third light guide plate is disposed between the second light guide plate and the privacy film. The third light guide plate has a third light incident surface corresponding to the second light incident surface, and the second light-emitting element is disposed opposite to the second light incident surface and the third light incident surface.

In an embodiment of the present invention, the surface of the first light guide plate has a first edge and a second edge. The first edge is connected to the second edge, and the light-emitting surface of the second light guide plate has a third edge corresponding to the first edge. The first light-emitting element may be disposed along the second edge, and the second light-emitting element may be disposed along the third edge.

In an embodiment of the present invention, a shape of the surface and a shape of the light-emitting surface are rectangular. The second edge is a short edge of the surface, and the third edge is a long edge of the light-emitting surface.

The backlight module of the present invention uses the first light guide plate having the optical microstructures, wherein the first convex surfaces of the optical microstructures face the first light incident surface when the optical microstructures are sunken from the surface, or the first convex surfaces face away from the first light incident surface when the optical microstructures are protruded from the surface, so as to ensure that most of the light beams reach the first convex surfaces. Furthermore, the first included angles respectively between the first convex surfaces and the surface are between 30° and 70°. In this way, most of the light beams reflected by the first convex surfaces can be emitted from the first light guide plate at large angles, thereby increasing the brightness of the light emitted from the backlight module at large angles. Also, because the first convex surfaces are located on the transmitting paths of most of the light beams, the first convex surfaces are able to guide most of the light beams to emit at angles roughly similar to each other, thereby making the backlight module provide an asymmetric viewing angle in the horizontal viewing angles. Additionally, the rounded corners are respectively connected to the first convex surfaces and the second convex surfaces, so that the rounded corners are located on the transmitting paths of a part of the light beams, and the radii of curvatures are between 0.001 mm and 0.005 mm. Hence, the rounded corners are able to scatter a part of the light beams emitted from the first light guide plate at large angles, and the first convex surfaces are also able to scatter the light beams by the feature of their own convex surfaces, thereby also improving the uniformity of the light emitted from the backlight module at large angles. As a result, the optical grade of the backlight module in the sharing mode can also be improved.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
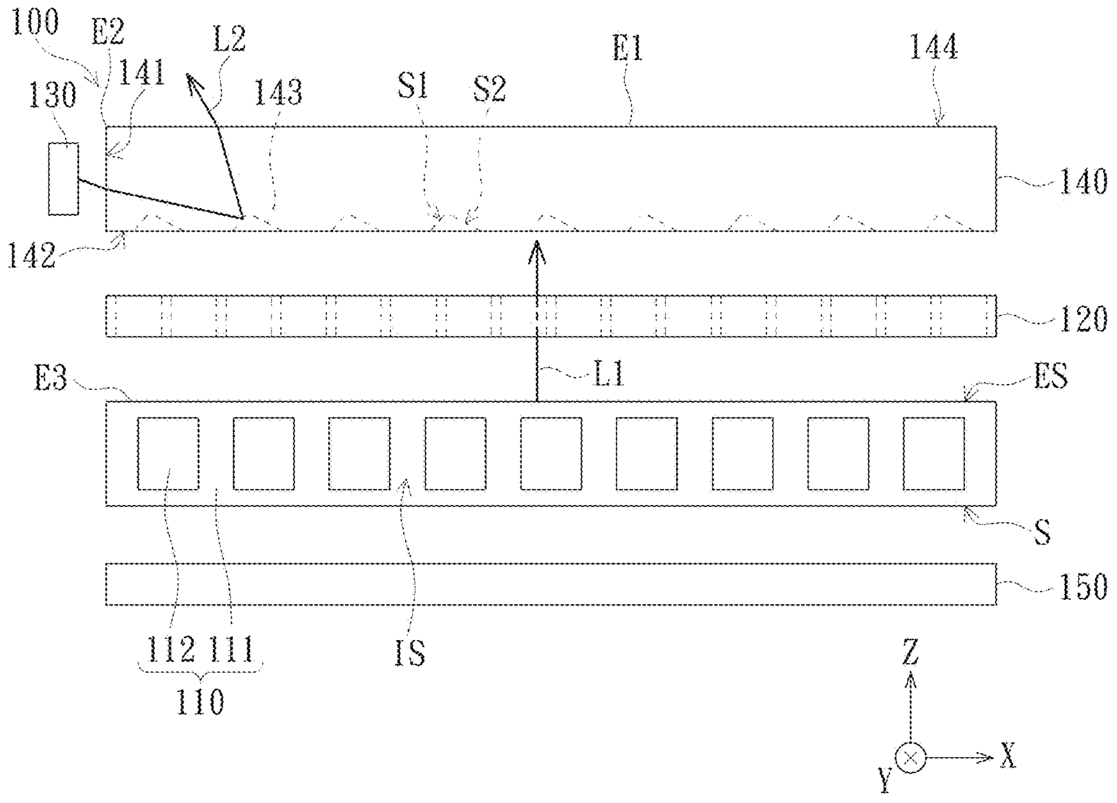
FIG. 1 is a schematic side view of a backlight module in an embodiment of the present invention.
Figure 2:
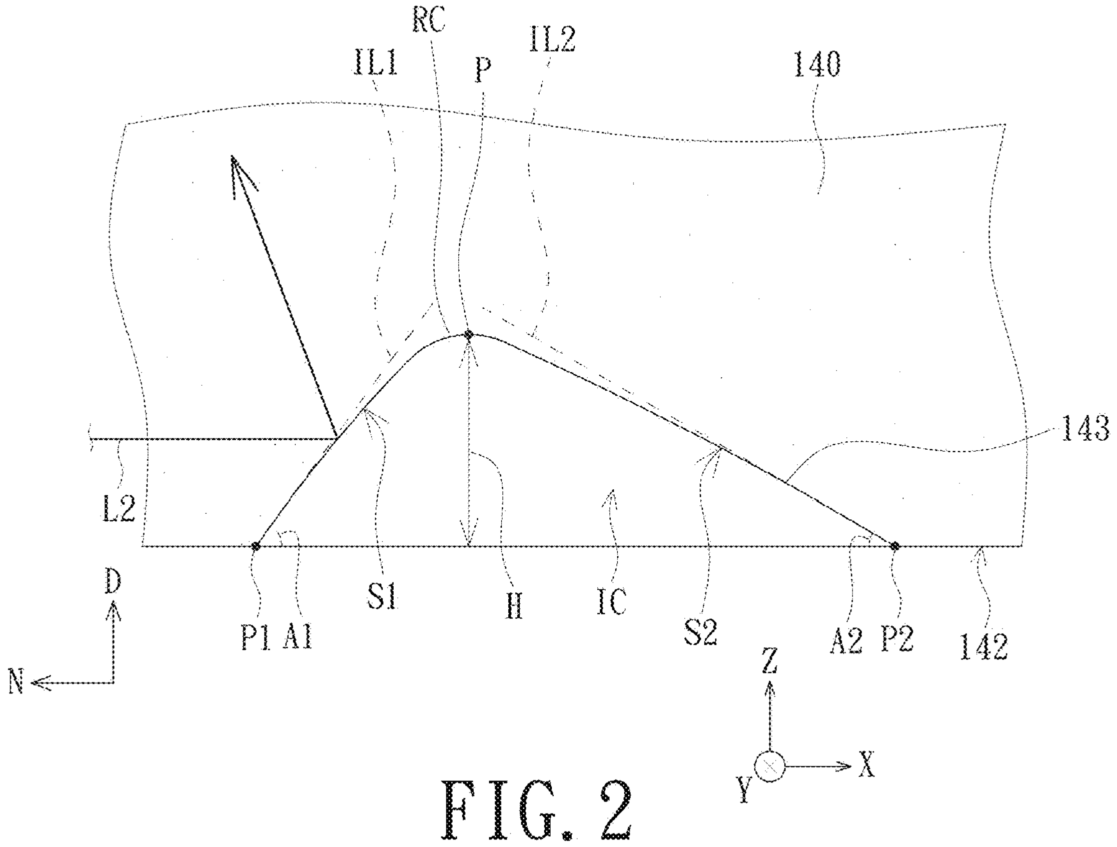
FIG. 2 is a partial schematic cross-sectional diagram of the first light guide plate in FIG. 1.
Figure 3:
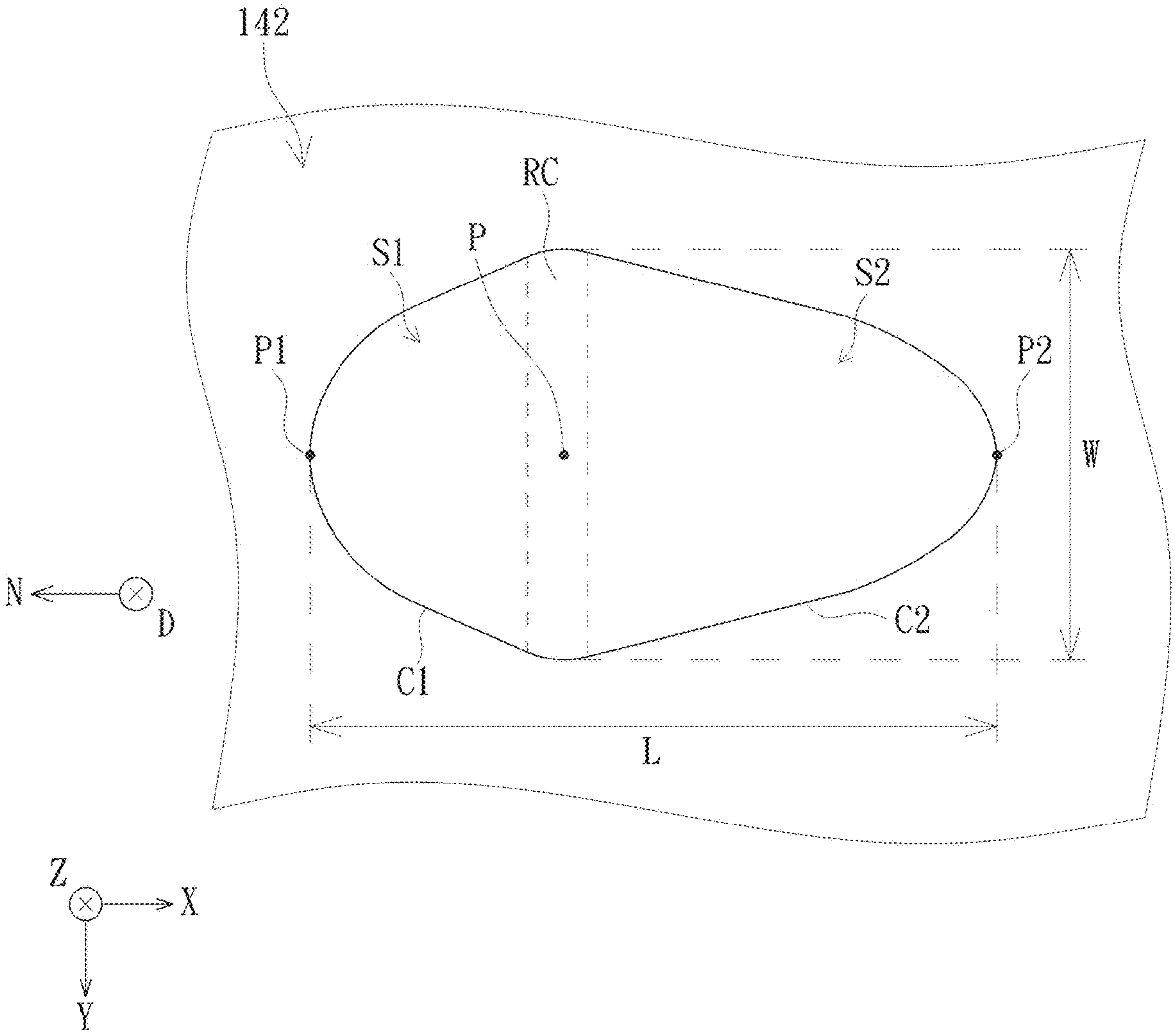
FIG. 3 is a schematic bottom view of the optical microstructures in FIG. 2.

FIG. 1 is a schematic side view of a backlight module in an embodiment of the present invention. FIG. 2 is a partial schematic cross-sectional diagram of the first light guide plate in FIG. 1. FIG. 3 is a schematic bottom view of the optical microstructures in FIG. 2. Referring to FIGS. 1 and 2 first, a backlight module 100 includes a light source assembly 110, a privacy film 120, a first light-emitting element 130, and a first light guide plate 140. The light source assembly 110 is adapted to emit a light beam L1. The privacy film 120 is disposed on a transmitting path of the light beam L1. The first light guide plate 140 is disposed on a side of the privacy film 120 facing away from the light source assembly 110. The first light guide plate 140 has a first light incident surface 141, a surface 142, and a plurality of optical microstructures 143. The first light incident surface 141 is opposite to the first light-emitting element 130, and the surface 142 faces the privacy film 120 and is connected to the first light incident surface 141. The optical microstructures 143 are sunken from the surface 142, and the optical microstructures 143 each have a first convex surface S1, a second convex surface S2, and a rounded corner RC. The first convex surface S1 and the second convex surface S2 stand on the surface 142, and the rounded corner RC is connected to the first convex surface S1 and the second convex surface S2. The first convex surfaces S1 face the first light incident surface 141, and the second convex surfaces S2 face away from the first light incident surface 141. A first included angle A1 between each of the first convex surfaces S1 and the surface 142 is between 30° and 70°, and radii of curvatures of the rounded corners RC are between 0.001 mm and 0.005 mm.

Please continue to refer to FIG. 1. The light source assembly 110 in this embodiment can include an edge-type backlight module or a direct-type backlight module, and FIG. 1 shows the edge-type backlight module as an example. For example, the light source assembly 110 may include a second light guide plate 111 and a second light-emitting element 112. The second light guide plate 111 has a second light incident surface IS and a light-emitting surface ES connected to the second light incident surface IS, and the light-emitting surface ES faces the privacy film 120. The second light-emitting element 112 is disposed opposite to the second light incident surface IS. Particularly, the second light-emitting element 112 is able to generate the light beam L1 entering the second light guide plate 111, and the light beam L1 is guided to be emitted from the light-emitting surface ES by the second light guide plate 111. In this embodiment, the second light-emitting element 112 may include a light-emitting diode (LED). In an embodiment, a surface S of the second light guide plate 111 facing away from the light-emitting surface ES may have a plurality of optical microstructures (not shown in the figures), and the optical microstructures are, for example, protruded from the surface S and may be in the shape of a triangular prism or a sphere, but not limited thereto. Incidentally, in this embodiment, a reflective sheet 150 may be disposed on a side of the second light guide plate 111 facing away from the privacy film 120 to improve the light utilization efficiency of the backlight module 100. However, the reflective sheet 150 can be omitted from the backlight module 100 in an embodiment in which the light source assembly 110 uses the direct-type backlight module 100.

In this embodiment, the privacy film 120 is able to reduce the exit angle of the light beam L1. Thus, when the light source assembly 110 is turned on and the first light-emitting element 130 is turned off, the backlight module 100 is able to provide a smaller viewing angle (i.e., a privacy mode). The privacy film 120 includes, for example, a grating, but other embodiments are not limited thereto. For example, in an embodiment, the privacy film 120 may include a liquid crystal layer, and an exit angle of the light beam L1 is reduced by controlling the rotation of the liquid crystal molecules.

In this embodiment, the first light-emitting element 130 is able to provide a light beam L2 required by the backlight module 100 in a sharing mode. The first light-emitting element 130 may include a light-emitting diode (LED), but the present invention is not limited thereto.

The first light guide plate 140 is able to guide the light beam L2 of the first light-emitting element 130 to be emitted from a light-emitting surface 144, wherein the light-emitting surface 144 faces away from the surface 142. Particularly, the optical microstructures 143 of the first light guide plate 140 are able to guide the light beam L2 to be emitted from the light-emitting surface 144 at a large angle, so the backlight module 100 is able to provide a larger viewing angle (i.e., the sharing mode) when the first light-emitting element 130 is turned on. Also, when the first light-emitting element 130 and the second light-emitting element 112 are turned on together, the backlight module 100 can have the advantages of a large viewing angle and high forward brightness at the same time.

Refer to FIGS. 1 and 2 again. The first convex surfaces S1 of the optical microstructures 143 are, for example, protruded toward the first light incident surface 141. Thus, the light beam L2 can be slightly scattered by the first convex surfaces S1, so that the brightness of the light emitted from the first light guide plate 140 is more uniform. The rounded corners RC are, for example, slightly arched on the surface 142, and the rounded corners RC each have a convex surface protruded toward the light-emitting surfaces 144 to scatter the incident light beam L2, thereby further improving the uniformity of the light emitted from the first light guide plate 140. The second convex surface S2 may be protruded in a direction opposite to the first light incident surface 141 to scatter a part of the light beams L2 to the light-emitting surface 144, so that the brightness of the light emitted from the first light guide plate 140 is more uniform. Incidentally, a part of the light beams L2 generated by the first light-emitting element 130 may be directly incident from the first light incident surface 141 onto the first convex surfaces S1 and the rounded corners RC, and another part of the light beams L2 may be totally internally reflected by the light-emitting surface 144 and then incident on the second convex surfaces S2 and the rounded corners RC, but the transmitting paths of the light beams L2 are not limited by the present invention.

Refer to FIGS. 2 and 3. A first contour C1 is formed on the surface 142 by each of the first convex surfaces S1. Each of the first contours C1 is curved, and each of the first contours C1 has a first top point P1 protruded opposite to each of the second convex surfaces S2. Each of the first convex surfaces S1 may have a first imaginary tangent IL1, and each of the optical microstructures 143 may further have an imaginary cross section IC. Each of the imaginary cross sections IC passes through each of the first top points P1, and each of the imaginary cross sections IC is perpendicular to the first light incident surface 141 and the surface 142. Each of the first imaginary tangents IL1 passes through each of the first top points P1, and each of the first imaginary tangents IL1 is located on each of the imaginary cross sections IC. The first included angles A1 can be respectively included between the first imaginary tangents IL1 and the surface 142. The imaginary cross sections IC are, for example, substantially parallel to the X-Z plane. In other words, the first included angle A1 is included between the first imaginary tangent IL1 and the surface 142. Particularly, the first convex surface S1 may be substantially in a shape of a conical surface, and the first contour C1 is formed along a connection between the conical surface and the surface 142. Moreover, the first contour C1 is, for example, substantially in a shape of a parabola and protruded toward the first light incident surface 141, and the first top point P1 can be a top point of the parabola. In an embodiment, each of the first included angles A1 is, for example, between 40° and 60°. In this way, the brightness of the light emitted from the backlight module 100 in the horizontal viewing angles approximately between −60° and −40°in the sharing mode can be increased. Incidentally, in another embodiment, a radius of curvature of each of the rounded corners RC is R, and 0.001 mm≤R≤0.005 mm, so as to further improve the uniformity of the light emitted from the first light guide plate 140. For example, the radius of curvature R may be 0.001 mm, 0.002 mm, 0.003 mm, 0.004 mm, or 0.005 mm, but the present invention is not limited thereto. Additionally, the radius of curvature of each of the first convex surfaces S1 may be less than or equal to 0.011 mm, but the present invention is not limited thereto.

Compared with prior art, the backlight module 100 in this embodiment uses the first light guide plate 140 having the optical microstructures 143, wherein the first convex surfaces S1 of the optical microstructures 143 face the first light incident surface 141 when the optical microstructures 143 are sunken from the surface 142, so as to ensure that most of the light beams L2 reach the first convex surfaces S1. Furthermore, the first included angles A1 included respectively between the first convex surfaces S1 and the surface 142 are between 30° and 70°, such as 30°, 35°, 40°, 45°, 50°, 55°, 60°, 65°, or 70°, but not limited thereto. Therefore, most of the light beams L2 reflected by the first convex surfaces S1 can be emitted from the first light guide plate 140 at large angles, thereby improving the brightness of the light emitted from the backlight module 100 at large angles. Also, because the first convex surfaces S1 are located on the transmitting paths of most of the light beams L2, the first convex surfaces S1 are able to guide most of the light beams L2 to emit at angles roughly similar to each other, thereby making the backlight module 100 provide an asymmetric viewing angle in the horizontal viewing angles. Additionally, the first convex surfaces S1 and the second convex surfaces S2 are respectively connected by the rounded corners RC, so that the rounded corners RC are located on the transmitting paths of a part of the light beams L2, and the radii of curvatures R are between 0.001 mm and 0.005 mm. Hence, the rounded corners RC are able to scatter a part of the light beams L2 emitted from the first light guide plate 140 at large angles, and the first convex surfaces S1 are also able to scatter the light beams L2 by the features of their own convex surfaces, thereby also improving the uniformity of the light emitted from the backlight module 100 at large angles. As a result, the optical grade of the backlight module 100 in the sharing mode can also be improved.

Figure 4:
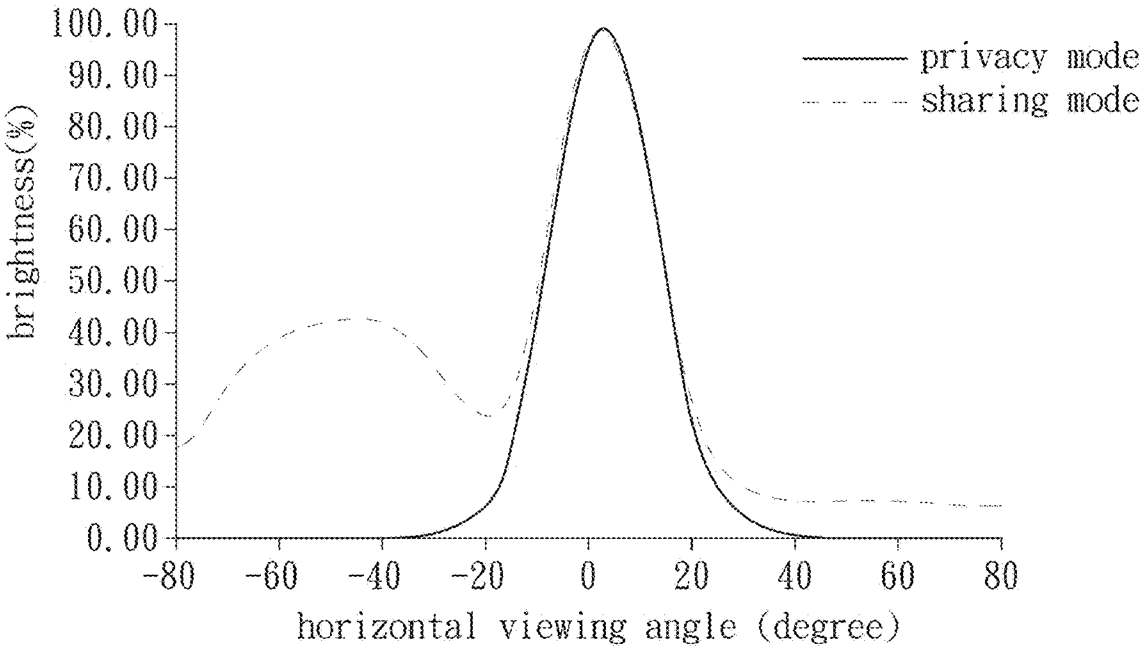
FIG. 4 is a schematic diagram of the brightness distribution of a backlight module in an embodiment of the present invention.
Figure 5:
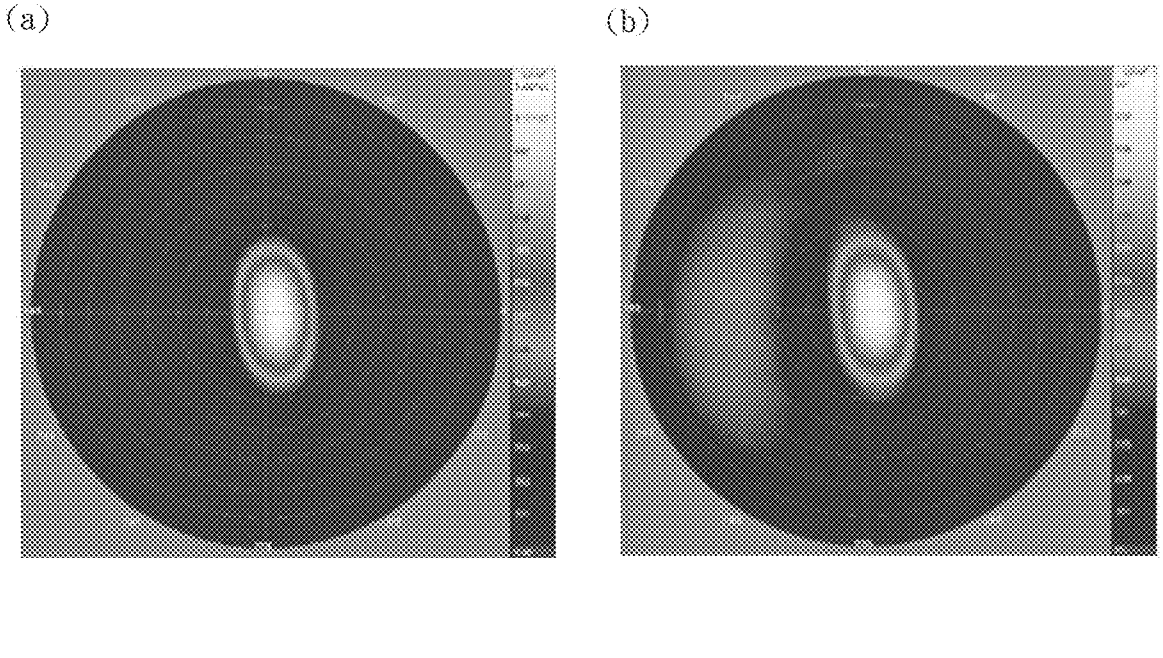
FIG. 5 is a schematic diagram of the light field of the light emitted from a backlight module in an embodiment of the present invention.

FIG. 4 is a schematic diagram of the brightness distribution of a backlight module in an embodiment of the present invention. FIG. 5 is a schematic diagram of the light field of the light emitted from a backlight module in an embodiment of the present invention, wherein (a) in FIG. 5 is a schematic diagram of the light field of the light emitted during the privacy mode, and (b) in FIG. 5 is a schematic diagram of the light field of the light emitted during the sharing mode. Please refer to FIG. 1 through FIG. 5, wherein FIGS. 4 and 5 illustrate examples in which the first included angles A1 are between 47° and 53°. When the backlight module 100 is in the privacy mode, the brightness of the emitted light is concentrated approximately between −20° and +20° of horizontal viewing angles. On the contrary, when the backlight module 100 is in the sharing mode, a part of the light beams L2 are reflected by the first convex surfaces S1 and emitted from the first light guide plate 140 at large angles. Thus, compared with the privacy mode, the brightness of the light emitted from the backlight module 100 between −80° and −20° in the horizontal viewing angles is significantly increased. It is worth mentioning that the brightness of the light emitted from the backlight module 100 does not significantly increase between 20° and 80° in the horizontal viewing angles as it does between −80° and −20°, so that the backlight module 100 provides an asymmetric viewing angle. In an embodiment, the backlight module 100 can be applied to a vehicle display device. For example, the vehicle display device can be installed in front of the driver's seat, so when the backlight module 100 is in the sharing mode, the asymmetric viewing angle can help the driver to see a screen of the vehicle display device, and can also prevent the light emitted from the screen from reflecting off a window next to the driver's seat and affecting the driver's ability to see a rearview mirror. It can be understood that the above application of the backlight module 100 is only an example and is not intended to limit the present invention.

Refer to FIGS. 2 and 3 again for illustrating other features of the optical microstructures 143. In one embodiment, a second included angle A2 included between each of the second convex surfaces S2 and the surface 142 is, for example, between 20° and 40°, so as to reflect a part of the light beams to be emitted from the first light guide plate 140 at large angles, thereby increasing the viewing angle of the backlight module 100. In this embodiment, a second contour C2 is formed on the surface 142 by each of the second convex surfaces S2. Each of the second contours C2 is curved, and each of the second contours C2 has a second top point P2 protruded opposite to each of the first convex surfaces S1. Each of the second convex surfaces S2 may have a second imaginary tangent IL2. Each of the imaginary cross sections IC passes through each of the second top points P2. Each of the second imaginary tangents IL2 passes through each of the second top points P2, and each of the second imaginary tangents IL2 is located on each of the imaginary cross sections IC. The second included angles A2 can be respectively included between the second imaginary tangents IL2 and the surface 142. In other words, the second included angle A2 is included between the second imaginary tangent IL2 and the surface 142. Similarly, the second convex surface S2 may be substantially in a shape of a conical surface, and the second contour C2 is formed along a connection between the conical surface and the surface 142. Moreover, the second contour C2 may be substantially in a shape of a parabola and protruded opposite to the first light incident surface 141, and the second top point P2 can be the top point of the parabola.

A maximum length L of each of the optical microstructures in a normal direction N of the first light incident surface 141 may range from 0.005 mm to 0.050 mm, wherein the normal direction N is, for example, substantially parallel to a direction X. On the other hand, a maximum width of each of the optical microstructures 143 in a direction D perpendicular to the normal direction N of the first light incident surface is W, wherein the direction D is, for example, substantially parallel to a direction Z. Each of the optical microstructures 143 may further have a top point P. Each of the top points P is located on a side of each of the rounded corners RC facing away from the surface 142, and a maximum height of each of the optical microstructures 143 between each of the top points P and the surface 142 is H, wherein $0.2 \leq H/W \leq 0.5$, such as 0.2, 0.25, 0.3, 0.35, 0.4, 0.45, or 0.5. For example, the maximum width W may be between 0.002 mm and 0.050 mm. Specifically, since the optical microstructures 143 are located on the transmitting paths of the light beams L2 of the light source assembly 110 (shown in FIG. 1), an area of an orthographic projection of each of the optical microstructures 143 on the surface 142 can be significantly reduced by setting the maximum length L and the maximum width W of each of the optical microstructures 143 to be within the above ranges. Thus, the interference of the optical microstructures 143 on the light beams L2 can be reduced, thereby further improving the uniformity of the light emitted from the backlight module 100. In an embodiment, the maximum length L may be, for example, approximately 0.005 mm, 0.008 mm, 0.01 mm, 0.015 mm, 0.02 mm, 0.025 mm, 0.03 mm, 0.035 mm, 0.04 mm, 0.045 mm, or 0.05 mm, and in another embodiment, the maximum width W may be, for example, approximately 0.005 mm, 0.01 mm, 0.015 mm, 0.02 mm, 0.025 mm, 0.03 mm, 0.035 mm, 0.04 mm, 0.045 mm, or 0.05 mm. Additionally, radii of curvatures of the second convex surfaces S2 may be less than or equal to 0.037 mm, but the specific values are not limited by the present invention.

In this embodiment, each of the maximum heights H is, for example, between 0.001 mm and 0.025 mm, so an area of the first convex surface S1 for receiving the light can be increased, thereby further increasing the brightness of the light emitted from the backlight module 100 at a large viewing angle. In an embodiment, the maximum heights H may be, for example, approximately 0.001 mm, 0.002 mm, 0.005 mm, 0.01 mm, 0.015 mm, 0.02 mm, or 0.025 mm, but other embodiments are not limited thereto.

Figure 6:
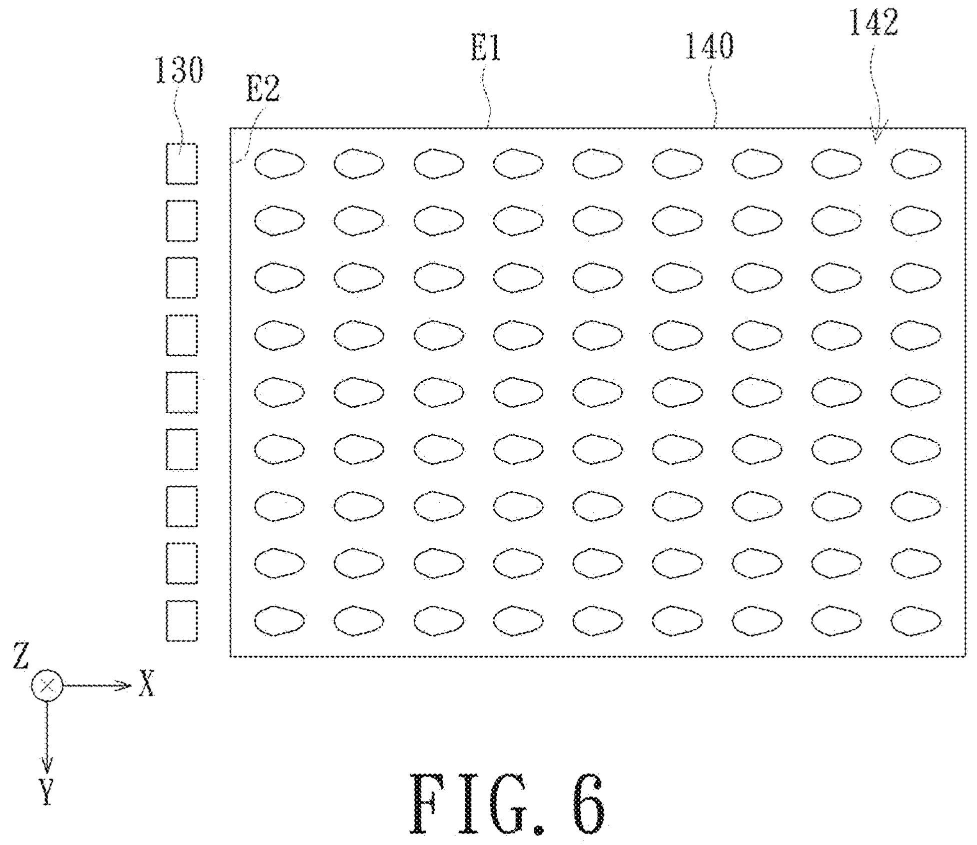
FIG. 6 is a schematic bottom view of the first light-emitting element and the first light guide plate in FIG. 1.
Figure 7:
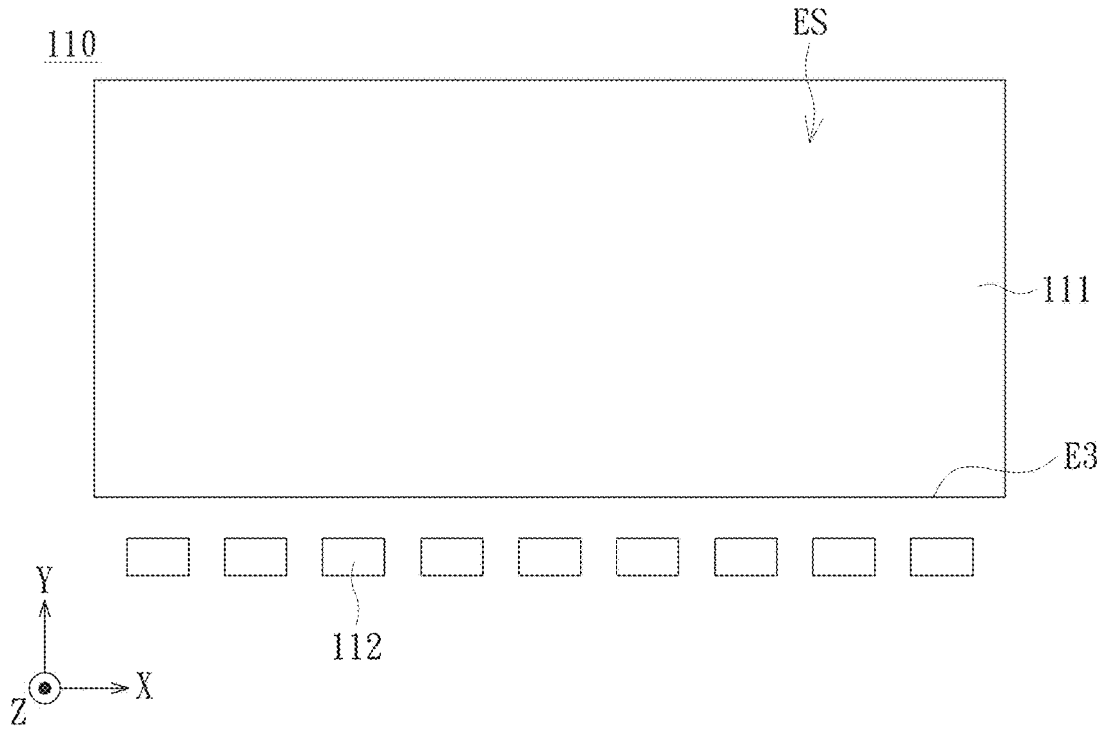
FIG. 7 is a schematic top view of the second light guide plate in FIG. 1.

FIG. 6 is a schematic bottom view of the first light-emitting element and the first light guide plate in FIG. 1. FIG. 7 is a schematic top view of the second light guide plate in FIG. 1. Refer to FIGS. 1, 6, and 7. Incidentally, in this embodiment, the surface 142 of the first light guide plate 140 has a first edge E1 and a second edge E2. The first edge E1 is connected to the second edge E2, and the light-emitting surface ES of the second light guide plate 111 has a third edge E3 corresponding to the first edge E1. The first light-emitting element 130 can be disposed along the second edge E2, and the second light-emitting element 112 can be disposed along the third edge E3. In other words, the first light-emitting element 130 and the second light-emitting element 112 may be disposed on different sides of the first light guide plate 140 and the second light guide plate 111. Furthermore, a shape of the surface 142 and a shape of the light-emitting surface ES are, for example, rectangular. The second edge E2 is a short edge of the surface 142, and the third edge E3 is a long edge of the light-emitting surface ES. In other words, the first light-emitting element 130 may be, for example, disposed along a side of the short edge of the first light guide plate 140, but is not limited thereto. Also, the second light-emitting element 112 may be, for example, disposed along a side of the long edge of the second light guide plate 111, but is not limited thereto.

Figure 8:
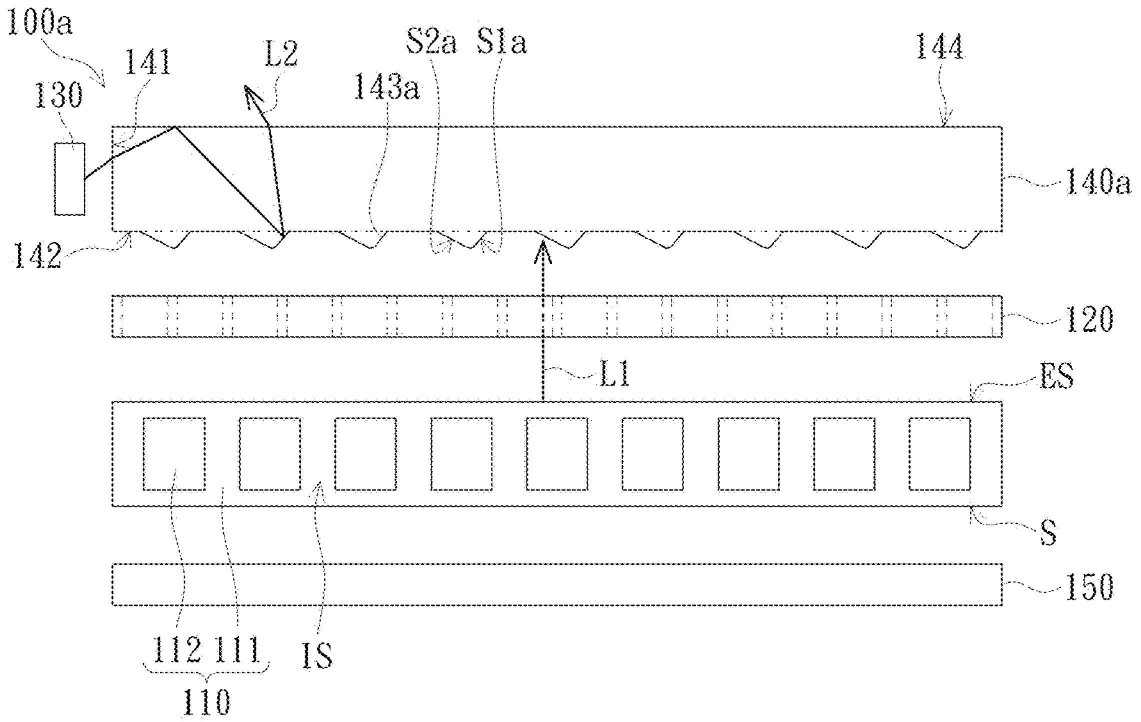
FIG. 8 is a schematic side view of a backlight module in another embodiment of the present invention.
Figure 9:
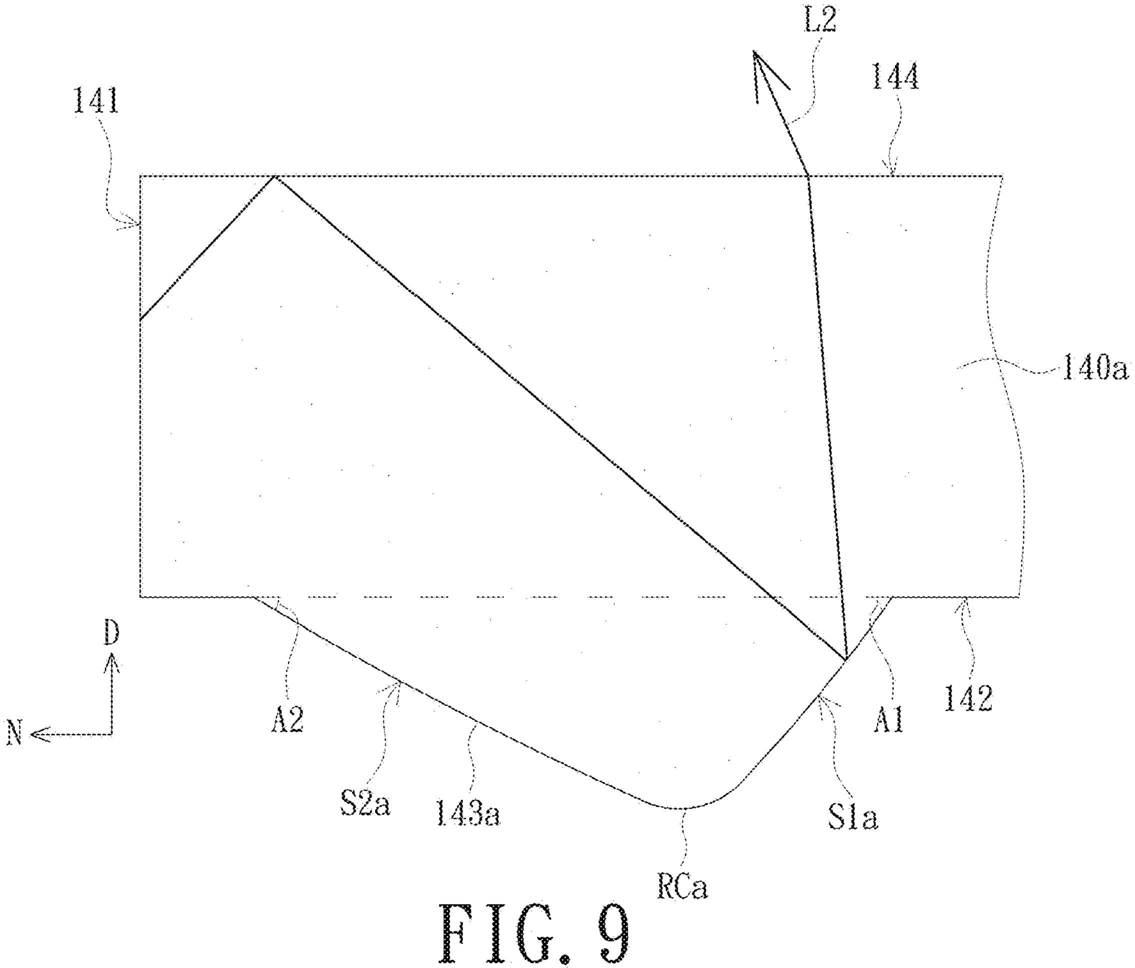
FIG. 9 is a partial schematic cross-sectional diagram of the first light guide plate in FIG. 8.

FIG. 8 is a schematic side view of a backlight module in another embodiment of the present invention. FIG. 9 is a partial schematic cross-sectional diagram of the first light guide plate in FIG. 8. The structure and advantages of the backlight module 100*a* in this embodiment are similar to those in the embodiment of FIG. 1, and only the differences are described below. Refer to FIGS. 8 and 9. The optical microstructures 143*a* are protruded from the surface 142. The first convex surfaces S1*a* face away from the first light incident surface 141, and the second convex surfaces S2*a* face the first light incident surface 141. Furthermore, most of the light beams L2, after entering the first light guide plate 140*a* through the first light incident surface 141, can be totally internally reflected to the first convex surfaces S1*a* by the light-emitting surface 144, and then reflected to the light-emitting surface 144 by the first convex surfaces S1*a*, thereby the light beams L2 being emitted from the light-emitting surface 144 at large angles. Similarly, a part of the light beams L2 are reflected to the light-emitting surface 144 by the rounded corners RCa and the second convex surfaces S2*a*. It should be noted that the first included angle A1 is located on a side of the optical microstructure 143*a* opposite to the first light incident surface 141, the rounded corners RCa are protruded away from the light-emitting surface 144, and the second included angle A2 is located on a side of the optical microstructure 143*a* facing the first light incident surface 141. Other features of the optical microstructures 143*a* are the same as those in the embodiment of FIG. 1, so the relevant description is omitted here.

Figure 10:
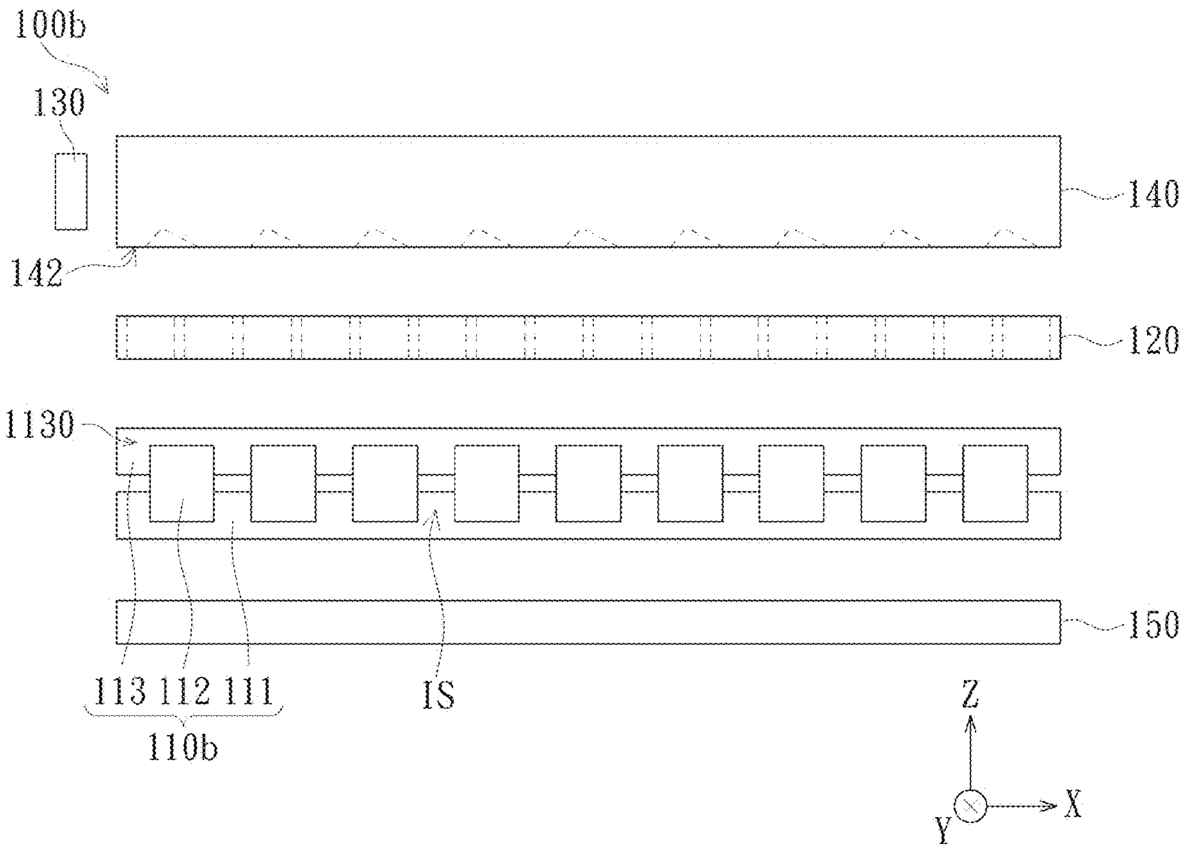
FIG. 10 is a schematic side view of a backlight module in another embodiment of the present invention.

FIG. 10 is a schematic side view of a backlight module in another embodiment of the present invention. The structure and advantages of the backlight module 100*b* in this embodiment are similar to those in the embodiment of FIG. 1, and only the differences are described below. Refer to FIG. 10. The light source assembly 110*b* further includes, for example, a third light guide plate 113. The third light guide plate 113 is disposed between the second light guide plate 111 and the privacy film 120. The third light guide plate 113 has a third light incident surface 1130 corresponding to the second light incident surface IS, and the second light-emitting element 112 is disposed opposite to the second light incident surface IS and the third light incident surface 1130. In short, the second light-emitting element 112 is able to emit a light beam to the second light incident surface IS and the third light incident surface 1130, the second light guide plate 111 is able to guide the light beam to reach the third light guide plate 113, and the third light guide plate 113 is able to guide the light beam to reach the privacy film 120. Incidentally, a number of the third light guide plate 113 in this embodiment may be one, but the number of the third light guide plate 113 may be plural in other embodiments, and the specific number of the third light guide plate 113 is not limited by the present invention.

In summary, the backlight module of the present invention uses the first light guide plate having the optical microstructures, wherein the first convex surfaces of the optical microstructures face the first light incident surface when the optical microstructures are sunken from the surface, or the first convex surfaces face away from the first light incident surface when the optical microstructures are protruded from the surface, so as to ensure that most of the light beams reach the first convex surfaces. Furthermore, the first included angles respectively between the first convex surfaces and the surface are between 30° and 70°. In this way, most of the light beams reflected by the first convex surfaces can be emitted from the first light guide plate at large angles, thereby increasing the brightness of the light emitted from the backlight module at large angles. Also, because the first convex surfaces are located on the transmitting paths of most of the light beams, the first convex surfaces are able to guide most of the light beams to emit at angles roughly similar to each other, thereby making the backlight module provide an asymmetric viewing angle in the horizontal viewing angles. Additionally, the rounded corners are respectively connected to the first convex surfaces and the second convex surfaces, so that the rounded corners are located on the transmitting paths of a part of the light beams, and the radii of curvatures are between 0.001 mm and 0.005 mm. Hence, the rounded corners are able to scatter a part of the light beams emitted from the first light guide plate at large angles, and the first convex surfaces are also able to scatter the light beams by the feature of their own convex surfaces, thereby also improving the uniformity of the light emitted from the backlight module at large angles. As a result, the optical grade of the backlight module in the sharing mode can also be improved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A backlight module, comprising:

a light source assembly, adapted to emit a light beam;

a privacy film, disposed on a transmitting path of the light beam;

a first light-emitting element; and a first light guide plate, disposed on a side of the privacy film facing away from the light source assembly, the first light guide plate having a first light incident surface, a surface, and a plurality of optical microstructures, the first light incident surface being opposite to the first light-emitting element, the surface facing the privacy film and being connected to the first light incident surface, the optical microstructures being sunken or protruded from the surface, the optical microstructures each having a first convex surface, a second convex surface, and a rounded corner, the first convex surface and the second convex surface standing on the surface, the rounded corner being connected to the first convex surface and the second convex surface, a first included angle included between each of the first convex surfaces and the surface being between 30° and 70°, and a radius of curvature of the rounded corner being between 0.001 mm and 0.005 mm;

wherein the first convex surfaces face the first light incident surface and the second convex surfaces face away from the first light incident surface when the optical microstructures are sunken from the surface, and the first convex surfaces face away from the first light incident surface and the second convex surfaces face the first light incident surface when the optical microstructures are protruded from the surface.

2. The backlight module according to claim 1, wherein each of the first included angles is between 40° and 60°.

3. The backlight module according to claim 1, wherein a first contour is formed on the surface by each of the first convex surfaces, each of the first contours is curved and has a first top point protruded opposite to each of the second convex surfaces, each of the first convex surfaces has a first imaginary tangent, each of the optical microstructures further has an imaginary cross section, each of the imaginary cross sections passes through each of the first top points and is perpendicular to the first light incident surface and the surface, each of the first imaginary tangents passes through each of the first top points and is located on the imaginary cross section, and the first included angles are respectively included between the first imaginary tangents and the surface.

4. The backlight module according to claim 1, wherein a second included angle included between each of the second convex surfaces and the surface is between 20° and 40°.

5. The backlight module according to claim 4, wherein a second contour is formed on the surface by each of the second convex surfaces, each of the second contours is curved and has a second top point protruded opposite to each of the first convex surfaces, each of the second convex surfaces has a second imaginary tangent, and each of the optical microstructures further has an imaginary cross section, each of the imaginary cross sections passes through each of the second top points and is perpendicular to the first light incident surface and the surface, each of the second imaginary tangents passes through each of the second top points and is located on each of the imaginary cross sections, and the second included angles are respectively included between the second imaginary tangents and the surface.

6. The backlight module according to claim 1, wherein a maximum length of each of the optical microstructures in a normal direction of the first light incident surface is between 0.005 mm and 0.050 mm.

7. The backlight module according to claim 1, wherein a maximum width of each of the optical microstructures in a direction perpendicular to a normal direction of the first light incident surface is W, each of the optical microstructures further has a top point, each of the top points is located on a side of each of the rounded corners facing away from the surface, and a maximum height of each of the optical microstructures between each of the top points and the surface is H, wherein $0.2 \leq H/W \leq 0.5$.

8. The backlight module according to claim 7, wherein each of the maximum widths is between 0.002 mm and 0.050 mm.

9. The backlight module according to claim 7, wherein each of the maximum heights is between 0.001 mm and 0.025 mm.

10. The backlight module according to claim 1, wherein the light source assembly comprises a second light guide plate and a second light-emitting element, the second light guide plate has a second light incident surface and a light-emitting surface connected to the second light incident surface, the light-emitting surface faces the privacy film, and the second light-emitting element is disposed opposite to the second light incident surface.

11. The backlight module according to claim 10, wherein the light source assembly further comprises a third light guide plate, the third light guide plate is disposed between the second light guide plate and the privacy film, the third light guide plate has a third light incident surface corresponding to the second light incident surface, and the second light-emitting element is disposed opposite to the second light incident surface and the third light incident surface.

12. The backlight module according to claim 10, wherein the surface of the first light guide plate has a first edge and a second edge, the first edge is connected to the second edge, the light-emitting surface of the second light guide plate has a third edge corresponding to the first edge, the first light-emitting element is disposed along the second edge, and the second light-emitting element is disposed along the third edge.

13. The backlight module according to claim 12, wherein a shape of the surface and a shape of the light-emitting surface are rectangular, the second edge is a short edge of the surface, and the third edge is a long edge of the light-emitting surface.

* * * * *